United States Patent Office 3,071,804
Patented Jan. 8, 1963

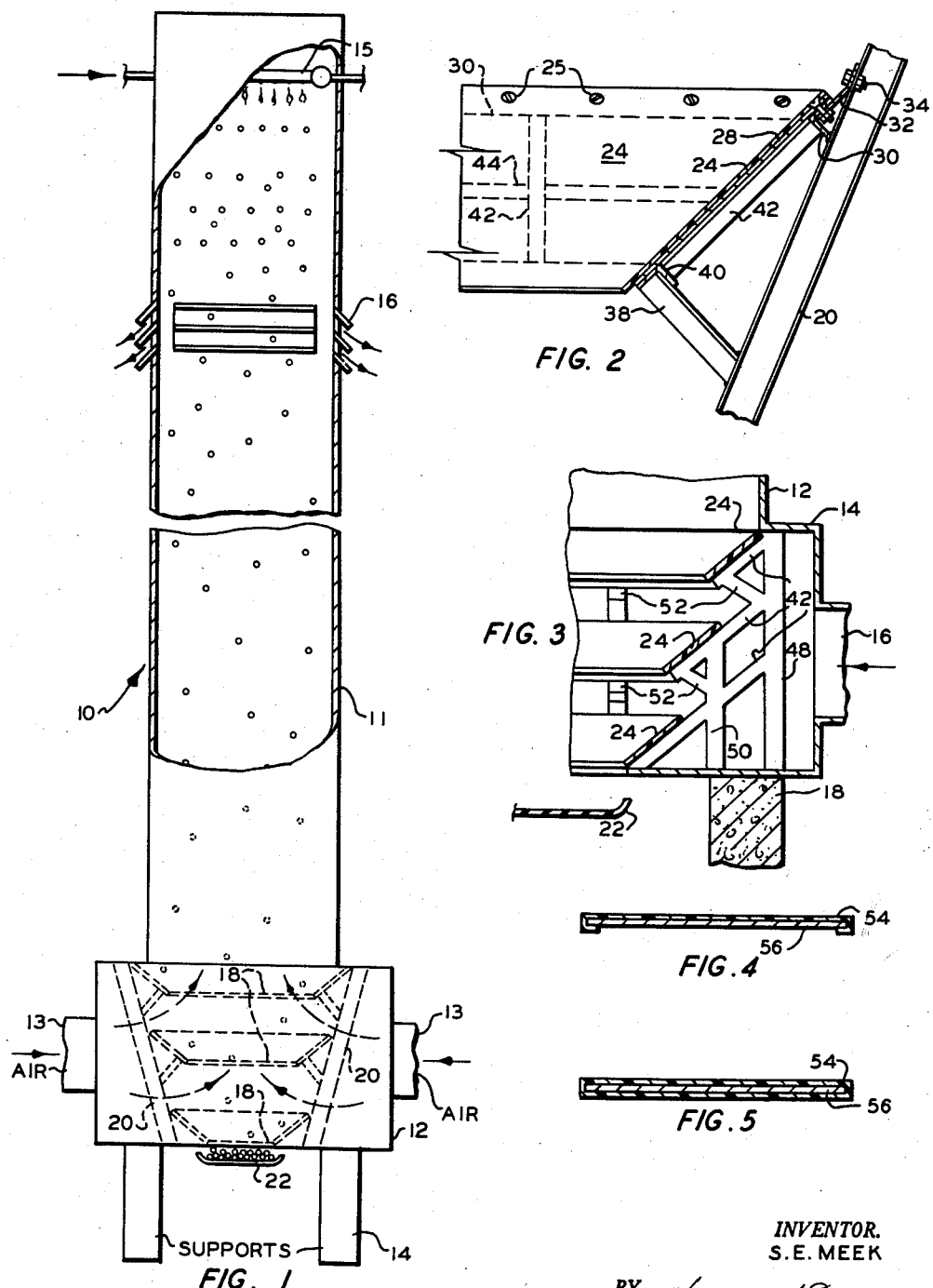

3,071,804
PRILLING TOWER AND PROCESS
Sherman E. Meek, Dumas, Tex., assignor to Phillips Petroleum Company, a corporation of Delaware
Filed July 15, 1960, Ser. No. 43,068
11 Claims. (Cl. 18—2.7)

This invention relates to an improved prilling tower structure and to a process for improved prilling of ammonium nitrate.

U.S. patent to F. A. Bower et al., 2,921,335 discloses the general type of prilling tower with which this invention is concerned. In the prilling process conducted in such a tower, molten ammonium nitrate is dispersed thru small orifices in the bottom of a series of parallel conduits running across the top of the tower. As the droplets gravitate thru the tower they are cooled by an ascending stream of air which is introduced thru louvers at the bottom of the tower and forced upwardly therethru, egressing thru vents in the walls of the tower just below the droplet-forming section. In the tower presently in operation in one plant, louvers are positioned around the walls of the rectangular tower in an overlapping, cascading arrangement, each subjacent louver being spaced apart from the louver above and extending farther inwardly so that the lowermost louvers deliver prills to a conveyor belt running thru the bottom of the tower just below the louver arrangement. In this manner the louvers form a sort-of-hopper for delivery for the prills to the conveyor while breaking the fall of the prills.

Originally, metal louvers (stainless steel) were utilized without any cover thereon and prills stuck to these louvers, building up thereon and requiring breaking and chiseling off in order to restore the original function of the louvers. In order to overcome this problem, the metal louvers were covered with rubber coated belting material, which was a slight improvement, but prills still adhered to and built up a thick layer (about 2 inches) on the belting over a substantial period of time.

Accordingly, it is an object of the invention to provide a prilling tower and louver construction which reduces or substantially eliminates the problem of prilling adherence to the louvers in the tower. Another object is to provide an improved prilling process which avoids adherence of prills to the equipment in the bottom of a prilling tower in the prilling of ammonium nitrate. Other objects of the invention will become apparent upon consideration of the accompanying disclosure.

It has been discovered that covering the louvers with polyethylene or similar plastic has substantially eliminated the sticking problem so that the prills slide off onto the conveyor belt substantially without sticking on the plastic.

A broad aspect of the invention comprises providing plastic surfaces in the bottom of a prilling tower against which ammonium nitrate prills fall on their descent thru the tower to the recovery means or conveyor belt which removes them from the tower. Linear, high density, polyethylene is the most suitable plastic for use in the invention because of its wax-like, relatively non-adhering surface with respect to ammonium nitrate prills and to its strength and toughness. Other plastics which are suitable substitutes for linear polyethylene comprise conventional high pressure polyethylene, polypropylene, copolymers of ethylene and propylene, and copolymers of ethylene and butylene, linear polyethylene is generally made by polymerizing ethylene in contact with chromium oxide on silica or silica-alumina at low pressures of the order of 400 to 600 p.s.i.g. and at relatively low temperatures of the order of 150 to 300° F. The density of linear polyethylene is in the range of 0.940 to 0.980 which is considerably higher than the density of high pressure polyethylene.

In order to provide a more complete understanding of the invention, reference is made to the accompanying schematic drawing of which FIGURE 1 is a vertical cross sectional view of the lower section of a prilling tower illustrating the invention; FIGURE 2 is a fragmentary view in vertical section thru one of the louvers in the tower of FIGURE 1; FIGURE 3 is a vertical section thru another arrangement of louvers suitable for use in a prilling tower; and FIGURES 4 and 5 are transverse sections of other types of louvers suitable for use in accordance with the invention.

Referring to FIGURE 1, tower 10 comprises a rectangular shell 11 supported by a steel framework not shown and to which is attached encircling plenum chamber 12. Air ducts 13 lead into opposite sides of the plenum chamber from blower means are not shown. The tower is supported on a concrete foundation 14.

Droplet forming means 15 is positioned in the top of the tower and is connected with a supply reservoir of molten ammonium nitrate not shown. Vents 16 just below the droplet forming section of the tower allow ascending air to escape into the atmosphere.

Louvers 18 are supported by steel I-beams or similar supports 20 positioned obliquely from adjacent the lower end of shell 12 toward prill conveyor 22 so that the louvers, sloping downwardly and inwardly overlap in cascading arrangement. The upper edge of each louver below the uppermost is radially outwardly from the lower edge of the louver just above. In this arrangement, descending prills contact only the inwardly sloping louver surfaces below the upper edge section of the louvers and do not fall thru the open space between the louvers into the plenum chamber but are directed inwardly and downwardly to conveyor 22.

The louver construction and support means therefor are shown more clearly in FIGURE 2. The louver in each instance comprises a polyethylene cover 24 attached by flat-head stainless steel bolts 25 to stainless steel sheet 28 thru angle iron 30 (extending completely around the tower) and support 32 which is bolted to support I-beam 20 by bolts 34. The lower edge of steel sheet 28 is supported by means of angle iron brace 38 to which angle iron 40 is fixed. This angle iron (40) extends longitudinally of the steel sheet to form a framework completely around the tower. Angle iron 30 also forms a support for the upper edge of the sheet completely around the tower. Another angle iron support 42 is positioned at intervals along the sheet and welded to angle irons 30 and 40. Other angle iron 44 is welded or otherwise fastened securely to the approximate midpoints of angle irons 42 to add further strength to the supporting structure.

Bolts 25 are positioned along the upper edge of the plastic and steel sheet where they are above the contacting area so that prills do not stick to the boltheads. The lower edge of the plastic covering is unattached or not directly fixed to the supporting structure as this is not necessary and it avoids the positioning of fastening means on the receiving surface of the plastic. The plastic cover extends beyond the supporting structure along the lower edge thereof to avoid any possibility of prills contacting the support material in this area. The upper edge of the upper most louver is outside the tower wall above so as to avoid contacting of prills with the boltheads thereon.

FIGURE 3 shows another arrangement of supporting structure for solid plastic louvers 24 each of which is attached directly at the upper edge by bolts or other means not shown directly to angle iron 42 and similar framework to that of FIGURE 2. These supporting angle irons are attached to vertical supports 48 and 50. Lowermost supporting angle iron 42 rests on the floor of the tower at its lower end and the lower ends of the upper supporting angle iron supports 52. This arrangement eliminates the stainless steel sheet. Other suporting arrangements of the louvers are well within the skill of the art.

FIGURES 4 and 5 show other structures for plastic covered metal sheets or louvers. In FIGURE 4 the plastic cover can be formed by molding a plastic sheet 54 around and over the edges of a metal sheet or plate 56. This can be done by heating the plastic to the softening point and bending its edges over the metal edges. In FIGURE 5 the plastic coating 54 on metal sheet 56 is formed by dipping metal sheet into molten plastic, withdrawing the sheet, and allowing the plastic to solidify. The thickness of coating can be increased to any desired thickness by repeated dipping. It is also within the skill of the art to completely coat a metal sheet with plastic by other methods.

While the prilling tower just described is of rectangular horizontal cross section, it is feasible to construct a prilling tower in cylindrical form, much the same as a silo, and utilize annular louvers in the bottom thereon in cascading arrangement around a circular outlet just above the conveyor belt.

Certain modifications of the invention will become apparent to those skilled in the art and the illustrative details disclosed are not to be construed as imposing unnecessary limitations on the invention.

I claim:

1. A prilling tower for prilling ammonium nitrate having in its top section means for forming and dispersing molten droplets of ammonium nitrate into the subjacent tower section for gravitation therethru to the bottom thereof; means for passing air up said tower and venting same from an upper section thereof below first said means including an expanded air chamber surrounding the base of said tower having air supply conduit means opening thereinto for cooling said droplets to prills; an open unobstructed prill outlet in the bottom of said tower in the center thereof; a series of louvers positioned inwardly from said air chamber along opposite sides of said tower spaced apart vertically to provide air passageways into said tower between the louvers and sloping inwardly and downwardly in overlapping cascading arrangement to deliver prills directly into said outlet; conveyor means subjacent said outlet for withdrawing prills as fast as they bounce off said louvers into said outlet so as to prevent build-up of a bed of prills on said louvers, the tower above said louvers and said outlet being unobstructed so as to permit direct descent of prills into said outlet; and plastic on the upper surfaces of said louvers, said plastic having a wax-like, substantially non-adhering surface relative to said prills.

2. The tower of claim 1 wherein said plastic is a polymer of the group consisting of polyethylene, polypropylene, copolymers of ethylene and propylene, and copolymers of ethylene and butylene.

3. The tower of claim 1 wherein said plastic is a linear polymer of ethylene having a density in the range of 0.940 to 0.980.

4. The tower of claim 1 wherein said louvers comprise metal sheet covered by a layer of said plastic.

5. The tower of claim 1 wherein said metal sheet is encased in plastic by dipping the metal sheet in hot molten plastic, removing the sheet, and allowing same to cool to solidify adhering plastic.

6. The tower of claim 1 wherein said louvers comprise a rigid backing material faced with said polymer.

7. The tower of claim 1 wherein said louvers are formed of relatively thick solid polymer sheet.

8. The tower of claim 1 including a metal framework supporting the top and bottom edges of said louvers; said plastic being bolted along the top edge to said louvers and framework and otherwise unattached to avoid contacting of prills with the attaching means.

9. The tower of claim 8 wherein said plastic is a linear polyethylene having a density in the range of 0.940 to 0.980.

10. A process for prilling ammonium nitrate comprising the steps of continuously dispersing droplets of molten ammonium nitrate in the upper end of a prilling tower; continuously gravitating said droplets thru said tower in countercurrent flow to cooling air directly onto an inwardly and downwardly sloping cascading arrangement of vertically spaced-apart louvers so as to deflect said prills into an axial outlet; providing said louvers with plastic, wax-like deflecting surfaces which are non-adhering to said prills; continuously supplying said cooling air by injecting some thru the spaces between said louvers; and continuously removing prills from below said outlet as soon as they pass thru same so as to prevent build-up of a bed of prills on said louvers and adherence of prills to said louvers.

11. The improvement of claim 10 wherein linear polyethylene having a density in the range of 0.940 to 0.980 is provided as said surfaces.

References Cited in the file of this patent

UNITED STATES PATENTS

| | | |
|---|---|---|
| 2,269,528 | Gallup | Jan. 13, 1942 |
| 2,543,069 | Shabaker | Feb. 27, 1951 |
| 2,714,224 | Schaub | Aug. 2, 1955 |
| 2,799,045 | Hillegas | July 16, 1957 |
| 2,825,721 | Hogan et al. | Mar. 4, 1958 |
| 2,921,335 | Bowers et al. | Jan. 19, 1960 |